Aug. 25, 1959  J. H. SNARTEMO  2,900,832
DOUBLE DRIVE

Filed Jan. 16, 1956  3 Sheets-Sheet 1

Inventor
Joseph H. Snartemo
by Robert B. Benson
Attorney

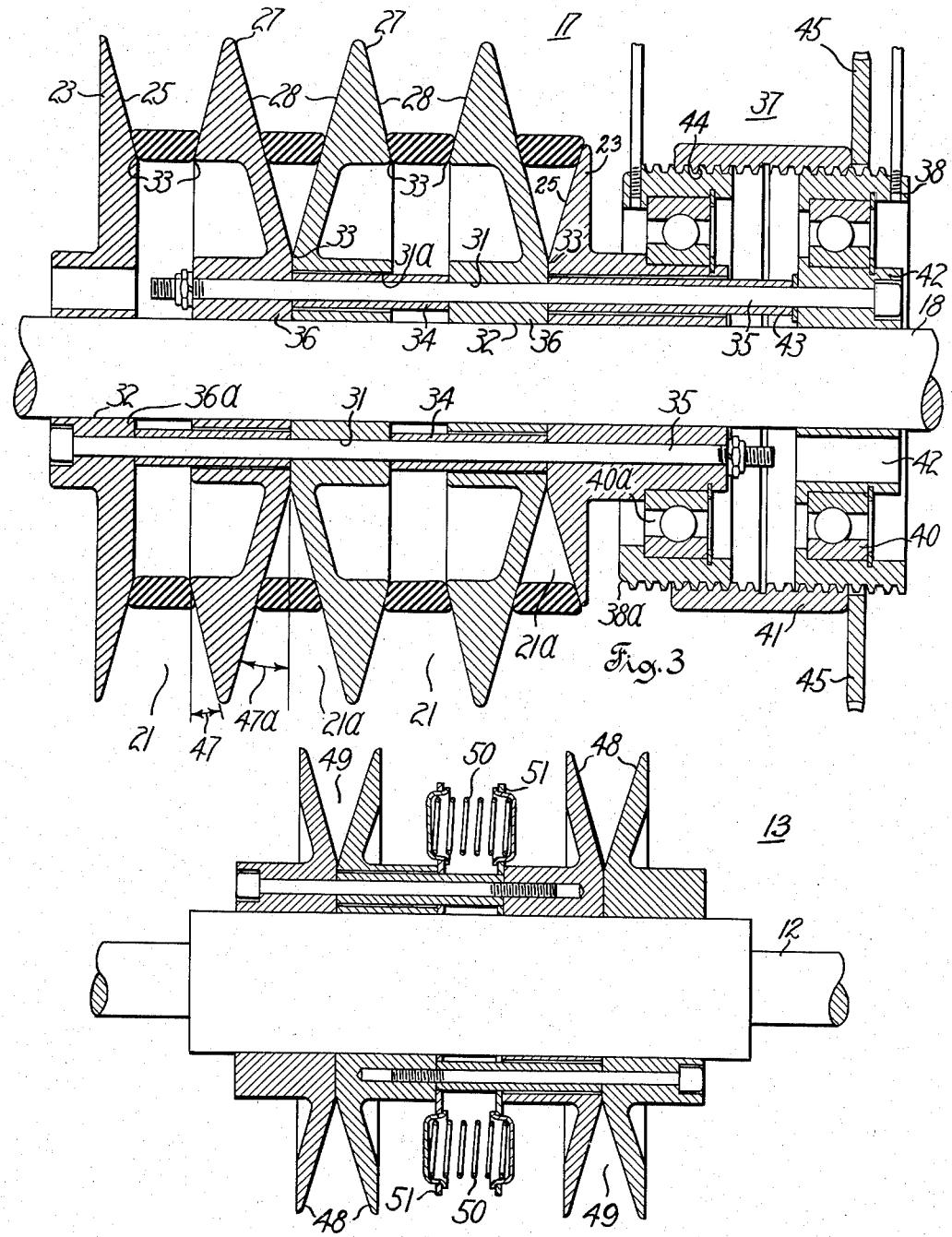

Aug. 25, 1959     J. H. SNARTEMO     2,900,832
DOUBLE DRIVE

Filed Jan. 16, 1956     3 Sheets-Sheet 3

Inventor
Joseph H. Snartemo
By Robert B. Benson
Attorney

United States Patent Office 2,900,832
Patented Aug. 25, 1959

2,900,832

DOUBLE DRIVE

Joseph H. Snartemo, Cincinnati, Ohio, assignor to Allis-Chalmers Manufacturing Company, Milwaukee, Wis.

Application January 16, 1956, Serial No. 559,272

10 Claims. (Cl. 74—230.17)

This invention relates generally to a variable speed power transmission device of the V-belt type. More specifically this invention relates to a V-belt power transmission device for varying the speed of the ouput sheave over a wide range of speeds while the drive is in motion without changing the relative positions of the shafts on which the sheaves are mounted.

There is a constant effort in the sheave industry to produce a compact variable speed power transmission which is capable of producing a wide range of speeds on the output sheave and in which the speed may be varied accurately and easily. The power transmission device of this invention meets the above mentioned requirements by combining automatic variable pitch sheaves on the input and output shafts with an intermediate motion control sheave having a vernier adjustment. The motion control sheave in effect replaces two conventional variable pitch sheaves because the intermediate disks have belt driving surfaces on both sides.

In some prior art variable speed power transmission drives using motion control sheaves, the shaft on which the motion control sheave is mounted is moved relative to the input and output shafts to vary the tension in the belts. The resulting change in belt tension causes floating disks of the motion control sheave to move axially along their shaft to compensate for the change in tension and thereby vary the pitch diameter of the belt driving grooves of the motion control sheave. On the other hand, in the drive of this invention the motion control sheave shaft is not moved relative to the input and output shafts, but rather the disks of the motion control sheave are positively moved axially along their shaft relative to each other to vary the pitch diameter in the grooves of the motion control sheave and thereby vary the tension in the belts engaging the grooves. The resulting change in tension in the belts correspondingly varies the pitch diameter of the spring loaded sheaves on the input and output shafts. The speed of the output sheave in the power transmission of this invention can be more easily and accurately controlled than in prior art transmissions because the countershaft is in a fixed position relative to the input and output shafts and all of the disks of the motion control sheave are moved axially along the shaft thereby causing the change in pitch diameter. In prior art power transmissions, either the countershaft is moved relative to the other shafts of the drive, or some of the disks of the intermediate motion control sheave are moved axially along the countershaft to vary the output speed of the drive.

Therefore, it is the object of this invention to provide a variable speed power transmission which is compact and in which the speed may be easily and accurately varied over a wide range of speeds.

Another object of this invention is to provide a variable speed power transmission having a greater capacity for speed variation.

Another object of this invention is to provide a variable speed power transmission which has a more accurate speed control than prior art power transmission.

Another object of this invention provides a variable speed power transmission in which it is easier to vary the speed than in prior art power transmissions.

Objects and advantages other than those set forth will be apparent from the description when read in connection with the drawings, in which:

Fig. 3 is a cross sectional view showing the motion control sheave taken along the line III—III of Fig. 1;

Fig. 4 is a cross sectional view of spring loaded sheave taken along the line IV—IV of Fig. 1.

Figure 1:
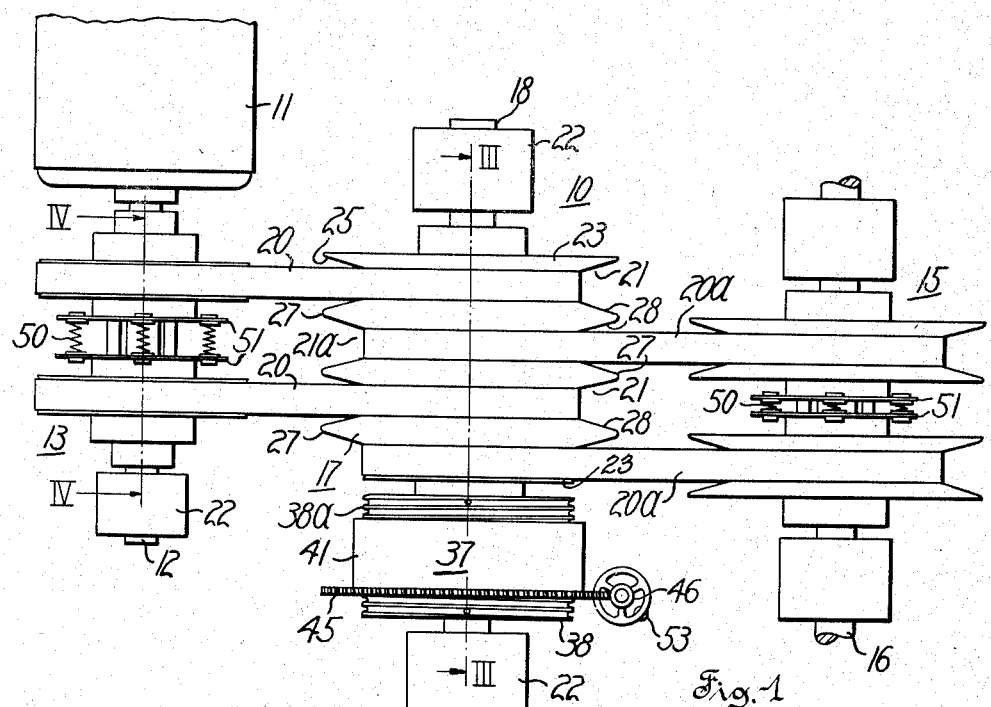
Fig. 1 is a top view of the drive showing the belts positioned in the grooves for maximum speed of the output shaft.

The variable speed power transmission drive 10 is illustrated in the drawings by a motor 11 driving a rotatable shaft 12 having a spring loaded variable pitch diameter automatic sheave 13 mounted thereon, a spring loaded variable pitch diameter sheave 15 mounted on an output shaft 16, a motion control sheave 17 mounted on a countershaft 18 positioned between the input and output shafts 12, 16 and a plurality of conventional V-belts 20, 20a engaging the sheaves 13, 15, 17. The V-belts 20 from the input sheave 13 engage alternate grooves 21 in the motion control sheave. The V-belts 20a from the output sheave 15 engage the other grooves 21a on the motion control sheave 17.

Referring more particularly to the drawings, the motor 11 in Fig. 1 is merely illustrative of any power means for driving the shaft 12. The motor 11 is mounted on a base, not shown, and drives the shaft 12 on which a multigroove automatic variable pitch sheave 13 is mounted. The variable pitch diameter sheave 13 mounted on the input shaft 12 is of the spring loaded type although it could be any of the various types of automatic sheave. A multigroove sheave is illustrated but it is obvious to one skilled in the art that a single groove pulley could be used with an appropriate motion control sheave.

A countershaft 18 is rotatably mounted on a base, not shown, by bearings 22 and is in a fixed position relative to the input and output shafts 12 and 16 during operation of the drive. The countershaft may be moved relative to the input and output shafts 12 and 16 to assemble the drive and to take up excessive slack in the V-belts. Mounted on the countershaft 18 is a multigroove variable pitch motion control sheave 17 which is best illustrated in Fig. 3. A motion control sheave is a sheave on which the pitch diameter of the various driving grooves may be varied while the sheave is rotating. The motion control sheave 17 of this drive has end disks 23 having driving surfaces 25 on their inner side and a plurality of intermediate disks 27 positioned between the end disks 23 and having driving surfaces 28 on both sides. Adjacent disks define therebetween the belt engaging V-shaped grooves 21, 21a. As shown in Fig. 3 the grooves 21 have a larger maximum pitch diameter than the grooves 21a. Although a plurality of intermediate disks are shown, the motion control sheave may have only one intermediate disk. In such a case the input and output sheaves would be single groove sheaves.

The disks 23, 27 are of the solid hub type and have arcuately spaced axially extending holes 31 positioned between the bore 32 and the radially inner edge 33 of the driving surfaces 25, 28. Alternate holes, which we will refer to as apertures 31a, for receiving spacers 34 and mounting bolts 35, are larger than the remaining holes 31 which are for receiving bolts 35 only. The apertures 31a of alternate disks are aligned with each other and with the bolt receiving holes 31 in adjacent disks to provide a clear channel for a mounting bolt 35.

Alternate disks are interconnected in sets 36, 36a for axial movement in unison along the countershaft 18. The alternate disks are connected by spacers 33 which abut one disk, extend through an aperture 31a in the adjacent disk and abut the next alternate disk. A bolt 35 extends through aligned holes 31 in the disks and aligned spacers 33 in alternate disks to connect the alternate disks as a set.

An adjusting mechanism 37 is mounted on one end of the motion control sheave 17. The adjusting mechanism 37 comprises a pair of externally threaded annular members 38, 38a, a pair of antifriction bearings 40, 40a and an adjusting collar 41. One of said members 38a is connected to an extension of the hub of the end disk 23 by the bearing 40a to mount the member 38a on the set of disks 36a for imparting axial movement to the set. The other member 38 is mounted on a sleeve 42 by the bearing 40. The sleeve 42 is connected to first intermediate disk 27 by a spacer element 43 to connect the member 38 to the set 36 for imparting axial movement to the set. One of the members 38 has a right handed thread the other of said members 38a has a left handed thread. The adjusting collar 41 has a threaded bore 44 which operatively engages both of said members 38, 38a. Rotation of said collar 41 in one direction causes said members 38, 38a to converge axially toward each other while rotation of the collar 41 in the opposite direction causes said members 38, 38a to move axially away from each other. The motion of these members 38, 38a is imparted to the sets of disks 36, 36a to which they are connected.

A worm wheel 45 is mounted on the outer surface of the collar 41. An externally mounted worm gear 46 operatively engages the wheel 45 on the collar 41 for rotating the collar. A handle 53 is attached to the worm gear 46 to provide easily accessible means for rotating the collar 41 and thereby adjusting the pitch diameter of the motion control sheave 17. The adjusting mechanism 37 and the worm gear attachment provide a vernier control for varying the pitch diameter of the grooves 21, 21a in the motion control sheave 17.

Figure 2:
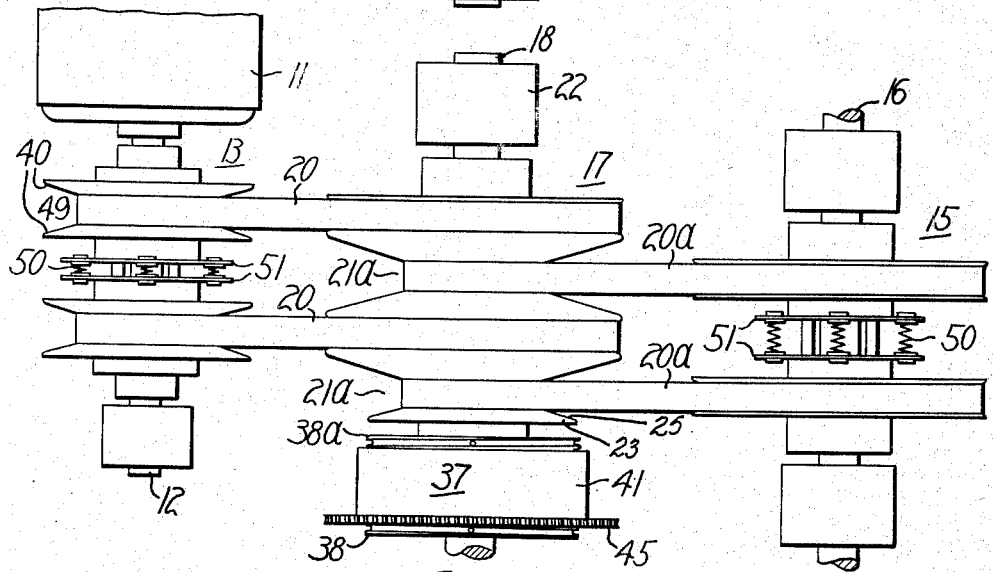
Fig. 2 is a top view of the drive showing the belts positioned in the grooves for minimum speed of the output shaft.

The sheaves 13, 15 on the input and output shafts 12, 16 are spring loaded variable pitch sheaves. A cross section of sheave 13 is shown in Fig. 2 and will be described in particular below. This description will serve to cover both sheaves 13 and 15. Although the spring loaded sheaves illustrated have only two driving grooves, it is obvious that the sheaves may have more grooves if necessary to operate with the motion control sheave. Similar parts on both sheaves will be identified by identical numbers.

The disks 48 of the spring loaded sheaves 13, 15 are axially movable along the shafts 12, 16. Adjacent disks form belt engaging grooves 49 and alternate disks are connected in sets in substantially the same way as the sets of disks in the motion control sheave 17. Resilient means, illustrated as springs 50, are positioned intermediate the adjacent central disks 48 and attached to the disks 48 by rings 51 to urge adjacent groove forming disks toward each other. The pitch diameter of the spring loaded sheaves 13, 15 is automatically responsive to the belt tension of the belts 20, 20a engaging the grooves 49 of the sheaves 13, 15 because the belt tension tends to force the disks axially away from each other in opposition to the force exerted by the springs 49. Therefore any change in the pitch diameter of the grooves 21, 21a on the motion controlled sheave 17 varies the tension in the belts 20, 20a which in turn causes a corresponding change in the pitch diameter of the grooves 49 in the spring loaded sheaves 13, 15 on the input and output shafts 12, 16. Any slight difference in the lengths of the belts 20, 20a around the sheaves or any belt stretch that may occur during the operation of the drive of this invention will also be taken up by the spring loaded sheaves 13, 15 thereby maintaining a good operating tension in the belts 20, 20a. It is important to maintain a proper operating tension in the belts because improper tension in the belts will cause slipping and excessive belt wear.

In operation the V-belts 20 from the input sheave 13 engage alternate grooves 21 in the motion control sheave 17 while the V-belts 20a from the output sheave 15 engage the other grooves 21a of the motion control sheave 17. The axial motion imparted to the disks 23, 27 by the operation of the adjusting mechanism 37 varies the relative position of adjacent disks on the countershaft 18 and hence changes the pitch diameter of the grooves 21, 21a of the motion control sheave 17. When the sets of disks 36, 36a move axially relatively to each other, the pitch diameter of one set of alternate grooves 21 or 21a increases while the pitch diameter of the other grooves 21 or 21a decreases. The change in the pitch diameter of the grooves 21, 21a in the motion control sheave 17 causes a change in the tension of the belts 20, 20a engaging these grooves. This change in belt tension causes a corresponding change in the pitch diameter of the grooves 49 of the spring loaded sheaves 13, 15 on the input and output shafts 12, 16 thereby maintaining a good operating tension in the belts 20, 20a.

If it is desirable, one set of disks on each sheave may be fixed on the shaft against axial movement by the usual well known means such as set screws or snap rings. As shown in the drive illustrated in Fig. 5 the disks 36 of the motion control sheave 17a are interconnected with member 38 of the adjusting mechanism 37 by bolt 35a. The annular member 38 is then connected to the countershaft 18 by suitable means such as the snap rings 100 positioned in grooves 101 in the countershaft 18 to prevent axial movement of the disks 36 relative to the shaft 18. However the other disks 36a are interconnected with annular member 38a of the adjusting mechanism 37 and are free to move with the annular member 38a axially relative to the shaft 18 to vary the pitch diameter of the sheave 17a.

In sheave 13a, which is similar to sheave 13 shown in Fig. 4, alternate disks 148 are interconnected and attached to the sleeve 150 by set screw 151 to prevent axial movement of the disks 148 relative to the sleeve 150. The other disks 148a are free to move axially on the sleeve 150 to vary the pitch diameter of the sheave 13a. The sleeve 150 is in turn attached to the shaft 152 by suitable means such as snap rings 153 positioned in grooves 154.

In output sheave 15a the disks 160 are interconnected and attached to the shaft 162 by set screw 164 to prevent axial movement of the disks relative to the shaft 162. The other disks 160a are free to move axially on the shaft 162 to vary the pitch diameter of the sheave 15a.

Figure 5:
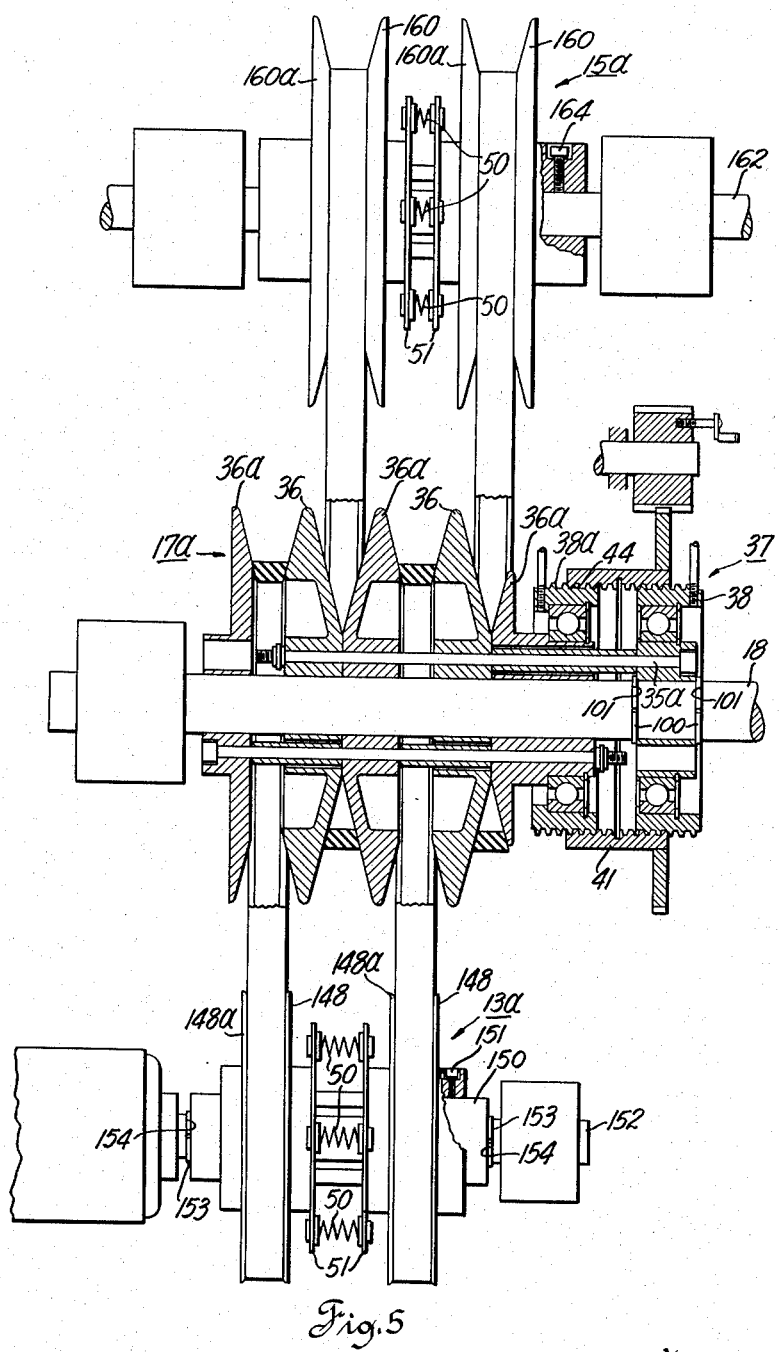
Fig. 5 is a side view partially in section of a drive of this invention in which only the alternate disks on the immediate sheave are movable axially relative to the shaft.

The same range of speed variation could be obtained in the drive shown in Fig. 5 as the drive shown in Figs. 1 and 2 because the axial distance the adjustable disks on the sheaves move would be equal to the sum of the distance that adjacent disk could move if they were both adjustable. The adjustable disks on the motion control and input or output sheaves which combine with their adjacent stationary disks to form a belt track are positioned diagonally from each other to maintain proper belt alignment in the grooves when the disks are moved to vary the pitch diameter of the grooves.

In the drive illustrated in Fig. 1, the belts 20, 20a are positioned in the grooves 21, 21a to give a maximum output speed. In Fig. 2, the belts 20, 20a are positioned in the grooves 21, 21a to give a minimum output speed. The output speed of sheave 15 can be varied anywhere between these limits by merely adjusting the handle 42 which controls the rotation of the adjusting collar 41. The speed of the output shaft 16 can be varied while the drive is operating and can be very accurately controlled because of the vernier adjusting mechanism operatively connected to the sets of axially movable disks 36, 36a.

The belts 20, 20a from the input and output sheaves 13, 15 are positioned in alternate grooves 21, 21a on the motion control sheave to balance the load on the bearings 22. The three sheaves 13, 15, 17 can be located with shaft center lines all in the same plane to reduce bearing loads on the intermediate shaft. An alternate arrangement is to position the shafts 12, 16, 18 so that their center lines form the apexes of an isosceles triangle when a plane is passed through their center lines at right angles thereto. Such an arrangement minimizes the wear on the disks due to unbalanced axial thrust. In such an arrangement the axial thrust is partially balanced because the belts engage the disks of the motion control sheave on nearly the same angular portion of the disks. Hence, the axial thrust exerted on a disk by one belt is substantially neutralized by opposite thrust exerted on the disk by the belt in the adjacent groove. This arrangement helps to reduce much of the cocking and tipping of the disks due to the unbalanced thrust exerted on the disks by the belts.

If the belts are properly aligned when initially installed they will remain properly aligned and parallel because the disks on all the sheaves move toward and away from each other simultaneously.

Although but one embodiment has been illustrated and described it will be apparent to those skilled in the art that various changes and modifications may be made herein without departing from the spirit of the invention or from the scope of the appended claims.

It is claimed and desired to secure by Letters Patent:

1. A variable speed drive comprising an automatic variable pitch diameter input sheave, an automatic variable pitch diameter output sheave, a countershaft disposed between said sheaves in a fixed position relative thereto, a motion control sheave structure mounted on said countershaft, said structure comprising a pair of end disks having a driving surface on their inner side, a plurality of intermediate disks having driving surfaces on both sides, said disks being axially slidably mounted on said countershaft, adjacent disks defining grooves therebetween, belts engaging said grooves, alternate belts being operatively connected to one of said automatic sheaves and the other belts being connected to the other of said automatic sheaves to transmit power from said input sheave to said output sheave, alternate disks of said motion control sheave being connected in sets for axial movement in unison toward and away from adjacent disks, and means for sliding said sets of disks axially along said countershaft to vary the pitch diameter of said grooves and thereby vary the speed of said driven sheave.

2. A variable speed drive comprising an automatic variable pitch diameter input sheave, an automatic variable pitch diameter output sheave, a countershaft disposed between said sheaves in a fixed position relative thereto, a motion control sheave structure mounted on said countershaft, said structure comprising a pair of end disks having an inclined driving surface on their inner side, a plurality of intermediate disks having inclined driving surfaces on both sides, said disks being axially slidably mounted on said countershaft, adjacent disks defining grooves therebetween, V-type belts engaging said grooves, alternate belts being operatively connected to one of said automatic sheaves and the other belts being connected to the other of said automatic sheaves to transmit power from said input sheave to said output sheave, alternate disks of said motion control sheave being connected in sets for axial movement in unison toward and away from adjacent disks, and means for sliding said sets of disks axially along said countershaft to vary the pitch diameter of said grooves and thereby vary the speed of said driven sheave.

3. A variable speed drive comprising an automatic variable pitch diameter input sheave, an automatic variable pitch diameter output sheave, a countershaft disposed between said sheaves in a fixed position relative thereto, a motion control sheave structure mounted on said countershaft, said structure comprising a pair of end disks having an inclined driving surface on their inner side, an intermediate disk having inclined driving surfaces on both sides, said disk being axially slidably mounted on said countershaft, adjacent disks defining grooves therebetween, V-type belts engaging said grooves, one belt being operatively connected to one of said automatic sheaves and the other belt being connected to the other of said automatic sheaves to transmit power from said input sheave to said output sheave, said end disks being connected in a set for axial movement in unison toward and away from said intermediate disk, and means for sliding said end disks and said intermediate disk axially along said countershaft toward and away from each other to vary the pitch diameter of said grooves and thereby vary the speed of said driven sheave.

4. A variable speed drive comprising an automatic variable pitch diameter input sheave, an automatic variable pitch diameter output sheave, a countershaft disposed between said sheaves in a fixed position relative thereto, a motion control sheave structure mounted on said countershaft, said structure comprising a pair of end disks having an inclined driving surface on their inner side, a plurality of intermediate disks having inclined driving surfaces on both sides, said disks being axially slidably mounted on said countershaft, adjacent disks defining grooves therebetween, V-type belts engaging said grooves, alternate belts being operatively connected to one of said automatic sheaves and the other belts being connected to the other of said automatic sheaves to transmit power from said input sheave to said output sheave, alternate disks of said motion control sheave being connected in sets for axial movement in unison toward and away from adjacent disks, and means for simultaneously sliding said sets of disks axially along said countershaft to vary the pitch diameter of said grooves and thereby vary the speed of said driven sheave.

5. A variable speed drive comprising a spring loaded variable pitch diameter input sheave, a spring loaded variable pitch diameter output sheave, a countershaft disposed between said sheaves in a fixed position relative thereto, a motion control sheave structure mounted on said countershaft, said structure comprising a pair of end disks having an inclined driving surface on their inner side, a plurality of intermediate disks having inclined driving surfaces on both sides, said disks being axially slidably mounted on said countershaft, adjacent disks defining grooves therebetween, V-type belts engaging said grooves, alternate belts being operatively connected to one of said spring loaded sheaves and the other belts being connected to the other of said spring loaded sheaves to transmit power from said input sheave to said output sheave, alternate disks of said motion control sheave being connected in sets for axial movement in unison toward and away from adjacent disks, and means for simultaneously sliding said sets of disks axially along said countershaft to vary the pitch diameter of said grooves and thereby vary the speed of said driven sheave.

6. A variable speed drive comprising a spring loaded variable pitch diameter input sheave, a spring loaded variable pitch diameter output sheave, a countershaft disposed between said sheaves in a fixed position relative thereto, a motion control sheave structure mounted on said countershaft, said structure comprising a pair of end disks having an inclined driving surface on their inner side, a plurality of intermediate disks having inclined driving surfaces on both sides, said disks being axially slidably mounted on said countershaft, adjacent disks defining grooves therebetween, V-type belts engaging said grooves, alternate belts being operatively connected to one of said spring loaded sheaves and the other belts being connected to the other of said spring loaded sheaves to transmit power from said input sheave to said output sheave, alternate disks of said motion control sheave being connected in sets for axial movement in unison toward and away from adjacent disks, an adjusting mechanism comprising an annular externally threaded member operably connected to one of said sets of disks, an annular externally oppositely threaded member operably connected to the other of said sets of disks, an adjusting collar threadedly engaging said members whereby rotation of said collar will simultaneously slide said sets of disks axially along said countershaft in opposite directions to vary the pitch diameter of said grooves and thereby vary the speed of said driven sheave.

7. A variable speed drive comprising a spring loaded variable pitch diameter input sheave, a spring loaded variable pitch diameter output sheave, a countershaft disposed between said sheaves in a fixed position relative thereto, a motion control sheave structure mounted on said countershaft, said structure comprising a pair of end disks having an inclined driving surface on their inner side, a plurality of intermediate disks having inclined driving surfaces on both sides, alternate disks on said motion control sheave being slidably mounted on said countershaft, the other of said disks being axially fixed on said countershaft, adjacent disks defining grooves therebetween, V-type belts engaging said grooves, alternate belts being operatively connected to one of said spring loaded sheaves and the other belts being connected to the other of said spring loaded sheaves to transmit power from said input sheave to said output sheave, said movable disks of said motion control sheave being connected in a set for axial movement in unison toward and away from said adjacent disks, an adjusting mechanism operably connected to said set of movable disks whereby actuation of said adjusting mechanism will slide said set of disks axially along said countershaft relative to said fixed disks to vary the pitch diameter of said grooves and thereby vary the speed of said driven sheave.

8. A variable speed drive comprising a spring loaded variable pitch diameter input sheave, a spring loaded variable pitch diameter output sheave, alternate disks on said spring loaded sheave being restrained against axial movement, the other disks on said spring loaded sheaves being axially movable toward and away from adjacent disks, a countershaft disposed between said sheaves in a fixed position relative thereto, a motion control sheave structure mounted on said countershaft, said structure comprising a pair of end disks having an inclined driving surface on their inner side, a plurality of intermediate disks having inclined driving surfaces on both sides, alternate disks on said motion control sheave being axially slidably mounted on said countershaft, the other of said disks being fixed against axial movement along said countershaft, adjacent disks defining grooves therebetween, V-type belts engaging said grooves, alternate belts being operatively connected to one of said spring loaded sheaves, and the other belts being connected to the other of said spring loaded sheaves to transmit power from said input sheave to said output sheave, said axially movable disks on said spring loaded sheaves being positioned diagonally from corresponding axially movable disks on said motion control sheave to keep said belts parallel and collinear, said movable disks being connected in sets for axial movement in unison toward and away from said adjacent disks, an adjusting mechanism operably connected to said set of movable disks on said motion control sheave, whereby actuation of said adjusting mechanism will slide said set of disks on said motion control sheave axially along said countershaft relative to said fixed disks to vary the pitch diameter of said grooves and thereby vary the speed of said driven sheave.

9. A variable speed drive comprising a spring loaded variable pitch diameter input sheave, a spring loaded variable pitch diameter output sheave, a countershaft disposed between said sheaves in a fixed position relative thereto, a motion control sheave structure mounted on said countershaft, said structure comprising a pair of end disks having an inclined driving surface on their inner side, a plurality of intermediate disks having inclined driving surfaces on both sides, said disks being axially slidably mounted on said countershaft, adjacent disks defining grooves therebetween, V-type belts engaging said grooves, alternate belts being operatively connected to one of said spring loaded sheaves and the other belts being connected to the other of said spring loaded sheaves to transmit power from said input sheave to said output sheave, the pitch diameter of said spring loaded sheaves being variable according to the change in tension in said belts, alternate disks on said motion control sheave being connected in sets for axial movement in unison toward and away from adjacent disks, an adjusting mechanism comprising an annular externally threaded member operably connected to one of said sets of disks, an annular externally oppositely threaded member operably connected to the other of said sets of disks, an adjusting collar threadedly engaging said members for simultaneously sliding said sets of disks axially along said countershaft in opposite directions whereby rotation of said collar varies the pitch diameter of said grooves and the tension in said belts thereby varying the pitch diameter of said spring loaded sheaves and the speed of said output sheave.

10. A variable speed drive comprising a spring loaded variable pitch diameter input sheave, a spring loaded variable pitch diameter output sheave, a countershaft disposed between said sheaves in a fixed position relative thereto, a motion control sheave structure mounted on said countershaft, said structure comprising a pair of end disks having an inclined driving surface on their inner side, a plurality of intermediate disks having inclined driving surfaces on both sides, said disks being axially slidably mounted on said countershaft, adjacent disks defining grooves therebetween, V-type belts engaging said grooves, alternate belts being operatively connected to one of said spring loaded sheaves and the other belts being connected to the other of said spring loaded sheaves to transmit power from said input sheave to said output sheave, each of said disks defines arcuately spaced bolt holes and apertures, said bolt holes are smaller than and position intermediate said apertures, said apertures of alternate disks and said bolt holes of intermediate disks are axially aligned, annular spacers are positioned in said apertures and extend between alternate disks to fix the axial distance between said alternate disks, bolts extending through axially aligned apertures, spacers and bolt holes to join said alternate disks in sets for axial movement in unison toward and away from adjacent disks, an adjusting mechanism comprising a pair of bearings, one of said bearings being mounted on one of said sets of disks and the other bearing being mounted on a sleeve, said sleeve being slidably mounted on said countershaft and connected to said other of said sets of disks by a spacer, an annular externally threaded member mounted on each of said bearings, one of said members being oppositely threaded from the other member, an adjusting collar having a threaded bore operatively engaging said members, a worm wheel mounted on said collar and an externally mounted worm gear operatively engaging said wheel for rotating said collar, whereby rotation of said worm and said collar will simultaneously slide said sets of disks axially along said countershaft in opposite directions to vary the pitch diameter of said grooves and thereby vary the speed of said driven sheave.

References Cited in the file of this patent

UNITED STATES PATENTS

| | | |
|---|---|---|
| 1,854,018 | Carlberg | Apr. 12, 1932 |
| 2,149,675 | Henry | Mar. 7, 1939 |
| 2,251,488 | Hucke | Aug. 5, 1941 |
| 2,348,994 | Otto | May 16, 1944 |
| 2,400,294 | Firth et al. | May 14, 1946 |
| 2,557,849 | Victory | June 19, 1951 |
| 2,610,516 | Otto | Sept. 16, 1952 |

FOREIGN PATENTS

| | | |
|---|---|---|
| 885,742 | France | June 7, 1943 |
| 923,252 | France | Feb. 17, 1947 |
| 617,940 | Great Britain | Feb. 14, 1949 |
| 1,030,297 | France | Mar. 11, 1953 |